United States Patent
Weiss

(10) Patent No.: US 10,173,737 B2
(45) Date of Patent: Jan. 8, 2019

(54) MOTOR VEHICLE REAR SPOILER ARRANGEMENT

(71) Applicant: Dr. Ing. h.c. F. Porsche Aktiengesellschaft, Stuttgart (DE)

(72) Inventor: Thomas Weiss, Tamm (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/726,401

(22) Filed: Oct. 6, 2017

(65) Prior Publication Data

US 2018/0099704 A1    Apr. 12, 2018

(30) Foreign Application Priority Data

Oct. 12, 2016   (DE) .......................... 10 2016 119 374

(51) Int. Cl.
  *B62D 35/00*  (2006.01)
  *B62D 29/04*  (2006.01)

(52) U.S. Cl.
  CPC ......... *B62D 35/007* (2013.01); *B62D 29/043* (2013.01); *B62D 29/048* (2013.01)

(58) Field of Classification Search
  CPC ... B62D 35/007; B62D 29/043; B62D 29/048
  USPC ........................................... 296/180.1, 180.5
  See application file for complete search history.

(56) References Cited

U.S. PATENT DOCUMENTS

| | | | |
|---|---|---|---|
| 5,013,081 A * | 5/1991 | Cronce | B62D 35/007 296/180.1 |
| 5,106,147 A | 4/1992 | Okada et al. | |
| 6,170,904 B1 * | 1/2001 | Schaedlich | B62D 35/007 180/903 |
| 6,672,651 B1 * | 1/2004 | Shuen | B62D 35/007 296/180.1 |

FOREIGN PATENT DOCUMENTS

| | | |
|---|---|---|
| EP | 2990173 A1 | 3/2016 |
| FR | 2707584 A | 1/1995 |

* cited by examiner

Primary Examiner — Joseph D. Pape
(74) Attorney, Agent, or Firm — Leydig, Voit & Mayer, Ltd.

(57) ABSTRACT

A motor vehicle rear spoiler arrangement includes a spoiler wing movable between a retracted inoperative position and an extended working position; a supporting body structure that defines a body recess; a recess cover that at least partially closes the body recess; and a support arrangement configured to support the spoiler wing (in its inoperative position on the recess cover. The support arrangement includes an elastic buffer element on a lower side of the spoiler wing, a support surface on an upper side of the recess cover, wherein the buffer element rests in the inoperative position on the support surface, and a separate supporting body arranged in the body recess and that supports a lower side of the recess cover in a region of the support surface on the body structure.

8 Claims, 1 Drawing Sheet

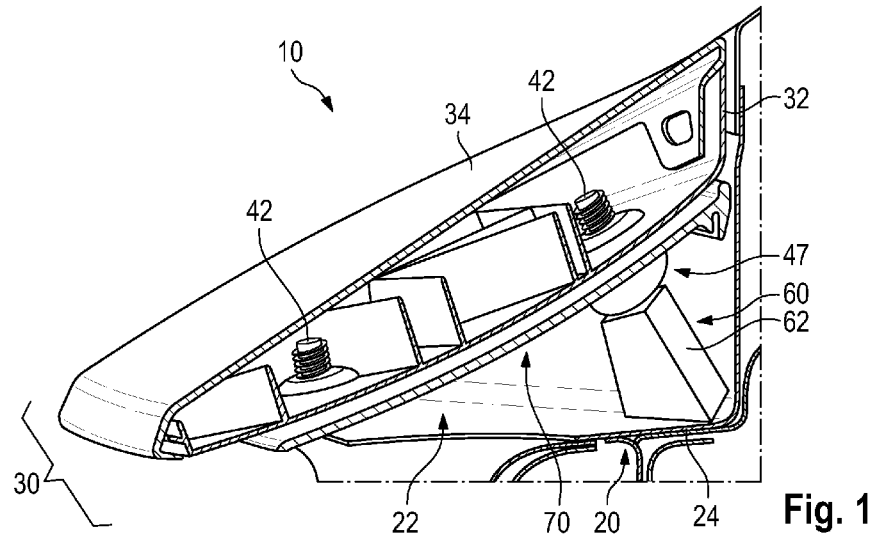
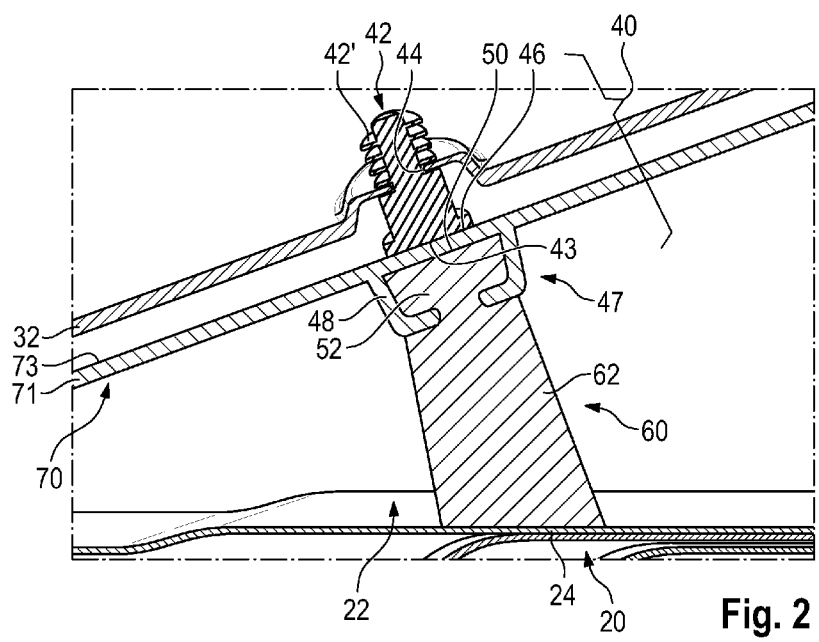

MOTOR VEHICLE REAR SPOILER ARRANGEMENT

CROSS REFERENCE TO RELATED APPLICATIONS

This application claims benefit to German Patent Application No. DE 10 2016 119 374.7, filed Oct. 12, 2016, which is hereby incorporated by reference herein.

FIELD

The invention relates to a motor vehicle rear spoiler arrangement, comprising a movable spoiler wing which is configured to be adjustable between a retracted inoperative position, in which the spoiler wing is substantially recessed into the body, and an extended working position, in which it generates down force.

BACKGROUND

A multiplicity of immovable rigid spoiler wings are known from the prior art, for example from FR 2 707 584 A, U.S. Pat. No. 5,106,147 A and EP 2 990 173 A1.

The movable spoiler wing sits in its inoperative position in a body recess, the recess space of which is at least partially covered by a recess cover. The recess cover serves to esthetically cover the recess space which is visible when the spoiler wing is extended. Depending on the design and mechanical stability of the spoiler wing adjustment mechanism, the spoiler wing may have to be additionally supported in its retracted inoperative position in order to ensure a vibration-free mounting of the spoiler wing on the supporting body structure. This can be made difficult by the fact that the recess cover does not provide sufficient stability for supporting the spoiler wing in its inoperative position.

SUMMARY

In an embodiment, the present invention provides a motor vehicle rear spoiler arrangement. The motor vehicle rear spoiler arrangement includes a spoiler wing movable between a retracted inoperative position and an extended working position; a supporting body structure that defines a body recess; a recess cover that at least partially closes the body recess; and a support arrangement configured to support the spoiler wing (in its inoperative position on the recess cover. The support arrangement includes an elastic buffer element on a lower side of the spoiler wing, a support surface on an upper side of the recess cover, wherein the buffer element rests in the inoperative position on the support surface, and a separate supporting body arranged in the body recess and that supports a lower side of the recess cover in a region of the support surface on the body structure.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows a longitudinal section of a motor vehicle rear spoiler arrangement; and FIG. 2 shows an enlarged illustration of the support arrangement of the rear spoiler arrangement of FIG. 1.

DETAILED DESCRIPTION

Embodiments of the invention to provide motor vehicle rear spoiler arrangements that facilitate a vibration-free mounting of the movable spoiler wing in a retracted inoperative position.

Motor vehicle rear spoiler arrangements according to embodiments of the present invention include a spoiler wing that is movable between a retracted inoperative position and an extended working position. The rear spoiler arrangements furthermore have a body recess which is formed and defined by a supporting body structure. The body recess at least partially receives the movable spoiler wing in its retracted inoperative position such that a substantially flat body impression is produced in this region. Further structural elements can also be provided in the body recess, in particular an adjustment mechanism by means of which the spoiler wing is moved between the inoperative position and the working position.

The rear spoiler arrangement has a recess cover, by means of which part of the body recess is visually covered in order to cover the structural elements, screws, etc., present in the body recess under the recess cover, so that an elegant appearance is thereby realized even in the region of the body recess.

A support arrangement is provided, by way of which the spoiler wing rests and is supported in its inoperative position on the recess cover. The recess cover at least partially does not rest directly on the body structure. Under some circumstances, the recess cover by itself is therefore not sufficiently stable in order to support the spoiler wing in its inoperative position at a plurality of points in such a manner that the spoiler wing does not vibrate. Added to this is the fact that the spoiler wing in its retracted inoperative position is mechanically prestressed inter alia by the adjustment mechanism. The recess cover therefore has to absorb considerable dynamic and also static forces in order to be able to support the spoiler wing in a correspondingly stable manner. However, the recess cover is provided partially spaced apart from the body structure.

A support arrangement is therefore provided, by way of which the spoiler wing is stably supported in its retracted inoperative position. The support arrangement has an elastic buffer element on the lower side of the spoiler wing. The elastic buffer element can consist, for example, of a rubber-elastic buffer body which projects slightly from the lower side contour of the spoiler wing. A support surface which corresponds to the buffer element and on which the buffer element rests in the inoperative position of the spoiler wing is provided on the upper side of the recess cover. The buffer body damps the striking of the spoiler wing on the recess cover and avoids scratching the support surface.

Finally, a separate supporting body is provided which is arranged in the body recess and supports the lower side of the recess cover in the region of the support surface on the body structure. The cover body of the recess cover is therefore supported in a punctiform and indirect manner on the body structure in the region of the support surface. This ensures that the recess cover support surface has high mechanical stability in particular in the direction of its surface normal, and therefore the spoiler wing which is supported on the support surface is stably supported and does not vibrate, and the recess cover cannot be deformed into the inoperative position by means of the prestressing of the spoiler wing.

The recess cover is preferably formed from a plastics cover body and on its lower side has a supporting body receptacle, into which a supporting body head is inserted. The plastics recess cover and the supporting body could basically be formed integrally and, for example, could be formed from an integral plastics body. Since, however, the supporting body has a certain size and solidity, deformation of the distal recess cover surface in the region of the support surface would thereby be unavoidable because of the shrinking of plastic upon cooling. This would result in an esthetically unattractive view on the visible distal surface of the recess cover. Owing to the fact that only a relatively thin-walled supporting body receptacle is injection molded onto the proximal lower side of the recess cover, the shrinkage-induced deformations and impairments in the region and on the side of the support surface are reduced to an inconsiderable minimum. Nevertheless, an extensive support by means of the separate supporting body can thereby be ensured in this region.

According to a preferred refinement, the supporting body receptacle is formed by a thin-walled cage, the wall thickness of which is at most 0.8 times the wall thickness of the cover body of the recess cover. The cage-like supporting body receptacle is therefore so thin-walled that virtually no production-induced and shrinkage-induced deformations occur on the distal side of the plastics recess cover.

The supporting body receptacle is preferably configured to be undercut in such a manner that the supporting body head is fixed in a form-fitting manner both in the proximal and in the distal direction by the supporting body receptacle. For the installation, the supporting body head can be pushed, for example laterally, into the supporting body receptacle or the cage and can optionally be latched there.

According to a preferred refinement, the buffer element is formed by a separate buffer body which plugs into a plug-in opening of the spoiler wing. The buffer body can be, for example, a rubber-elastic body which is elastically deformable within certain limits.

The supporting surface of the supporting body head which proximally supports the recess cover in the region of the support surface is preferably larger than the impact surface of the buffer element, with which impact surface the buffer element rests on the support surface on the distal upper side of the recess cover in the retracted inoperative position. This ensures that the region of the support surface is not deformed by the buffer element striking and lying there against.

According to a preferred refinement, the support surface is formed by the smooth and step-free distal surface of the recess cover. The recess cover is smooth and not particularly machined on its distal side in the region of the support surface. This results in a steady visual appearance of the recess cover which is visible from the outside when the spoiler wing is in the extended working position.

The supporting body preferably consists of a fiber-reinforced plastics body. In particular, in the case of a motor vehicle with a rear engine, temperatures around 100° C. can occur in the region of the rear-side spoiler wing, as a result of which in particular plastics can become so soft that plastics components could be plastically deformed by the forces which occur. In order to prevent this, the supporting body is fiber reinforced, and therefore the supporting body maintains its shape even over the long term at high ambient temperatures, and is not plastically deformed.

FIG. 1 illustrates a longitudinal section of a motor vehicle rear spoiler arrangement 10 of a motor vehicle with a rear engine. The rear spoiler arrangement 10 has a spoiler wing 30 which is movable between a retracted inoperative position and an extended working position and which is illustrated in the retracted inoperative position in FIGS. 1 and 2. The rear region of the motor vehicle has a supporting metal body structure 20 which forms a body recess 22, into which the spoiler wing 30 is partially recessed in its retracted inoperative position. For structural reasons, the body recess 22 is configured to be lower than would be required for receiving the spoiler wing 30 in its retracted inoperative position.

The spoiler wing 30 is adjustable between the inoperative position and the working position via an electrically driven adjustment mechanism (not illustrated) which is supported on the body structure 20. The spoiler wing 30 has a stiff and supporting metal spoiler blade 32 which substantially forms the proximal lower side of the spoiler wing 30, and a spoiler cover 34 which closes the spoiler blade 32 on the distal upper side. A respective buffer element 42 which is formed in each case by a rubber-elastic buffer body 42' is inserted into the spoiler blade 32 of the spoiler wing 30 in two plug-in openings 44 of the spoiler blade 32. The two buffer elements 42 each project downward slightly from the contour of the spoiler wing 30.

The spoiler wing 30 has the two buffer elements 42 at its respective lateral transverse ends, whereas the adjustment mechanism is provided in the central region of the spoiler wing 30. In principle, the adjustment mechanism, on the one hand, and the buffer elements, on the other hand, can also be arranged and distributed the other way around, i.e. the two times two buffer elements in the center and an adjustment mechanism half on each side.

The body recess 22 is partially closed by a recess cover 70 which is formed by a fiber-reinforced plastics cover body 71 which has a distal upper side 73 which faces the spoiler wing 30. The spoiler recess remaining in this manner in the body contour is virtually completely filled by the spoiler wing 30 in its retracted inoperative position. The inclination of the recess cover 70 corresponds approximately to the inclination of the spoiler wing 30 in its retracted inoperative position.

In the retracted inoperative position of the spoiler wing 30 that is illustrated in FIGS. 1 and 2, the spoiler wing 30 is mechanically supported indirectly on the body structure 20 by a support arrangement 40.

In the retracted inoperative position of the spoiler wing 30, the two buffer elements 42 rest on the distal upper side 73 of the recess cover 70 and thereby each define a support surface 46 in this region on the upper side 73 of the recess cover 70. The front support surface 46, as seen in the direction of travel, is supported by a separate supporting body 60 arranged in the body recess 22.

The supporting body 60 substantially consists of a fiber-reinforced plastics body 62 which is oriented approximately at a right angle to the main surface of the recess cover 70 and projects proximally downwards from the recess cover 70. The supporting body 60 has a supporting body head 52 which is inserted into a supporting body receptacle 47 on the lower side of the recess cover 70. The supporting body receptacle 47 is formed by a thin-walled cage 48, the wall thickness of which is approximately 0.6 times the wall thickness of the recess cover 70. The supporting body receptacle 47 is undercut in such a manner that the supporting body head 52 can be pushed only laterally into the receptacle 47, but is fixed in a form-fitting manner in the proximal and distal direction by the receptacle 47.

The supporting body head 52 distally has a supporting surface 50 which lies over the full surface area against the proximal side of the recess cover 70 in the region of the support surface 46 on which the buffer element 42 rests. The supporting surface 50 of the supporting body head 52 is approximately twice as large as the impact surface 43 of the buffer element 42 resting on the support surface 46. The supporting body 60 stands with its proximal end on a body sheet 24 of the body structure 20, and is fixed laterally there, for example by adhesive bonding, but is not screwed to the body structure.

As can be gathered from the two figures, the support surface 46 is formed by the smooth distal surface 73 of the recess cover 70, and is not particularly machined or reinforced.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A motor vehicle rear spoiler arrangement, comprising:
   a spoiler wing movable between a retracted inoperative position and an extended working position;
   a supporting body structure that defines a body recess;
   a recess cover that at least partially closes the body recess; and
   a support arrangement configured to support the spoiler wing in its inoperative position on the recess cover,
   wherein the support arrangement includes:
      an elastic buffer element on a lower side of the spoiler wing,
      a support surface on an upper side of the recess cover, wherein the buffer element rests in the inoperative position on the support surface, and
      a separate supporting body arranged in the body recess and that supports a lower side of the recess cover in a region of the support surface on the body structure.

2. The motor vehicle rear spoiler arrangement as claimed in claim 1, wherein the recess cover is formed from a plastics cover body, and
   wherein a supporting body receptacle into which a supporting body head can be inserted is located on the lower side of the recess cover.

3. The motor vehicle rear spoiler arrangement as claimed in claim 2, wherein the supporting body receptacle is formed by a thin-walled cage having a wall thickness of at most 0.8 times a wall thickness of the recess cover.

4. The motor vehicle rear spoiler arrangement as claimed in claim 2, wherein the supporting body receptacle is undercut in such a manner that the supporting body head is fixed in a proximal and distal direction by the supporting body receptacle.

5. The motor vehicle rear spoiler arrangement as claimed in claim 1, wherein the buffer element is formed by a separate buffer body which plugs in a plug-in opening of the spoiler wing.

6. The motor vehicle rear spoiler arrangement as claimed in claim 2, wherein the supporting surface of the supporting body head is larger than an impact surface of the buffer element.

7. The motor vehicle rear spoiler arrangement as claimed in claim 1, wherein the support surface is formed by a smooth distal surface of the recess cover.

8. The motor vehicle rear spoiler arrangement as claimed in claim 1, wherein the supporting body consists of a fiber-reinforced plastics body.

* * * * *